US012727000B2

(12) United States Patent
Matsumura et al.

(10) Patent No.: US 12,727,000 B2
(45) Date of Patent: Sep. 1, 2026

(54) TERMINAL, RADIO COMMUNICATION METHOD, BASE STATION, AND SYSTEM FOR CONTROLLING PHYSICAL DOWNLINK CONTROL CHANNEL WITH REPETITION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 515 days.

(21) Appl. No.: 18/250,860

(22) PCT Filed: Nov. 2, 2021

(86) PCT No.: PCT/JP2021/040323
§ 371 (c)(1),
(2) Date: Apr. 27, 2023

(87) PCT Pub. No.: WO2022/097617
PCT Pub. Date: May 12, 2022

(65) Prior Publication Data

US 2023/0413287 A1 Dec. 21, 2023

(30) Foreign Application Priority Data

Nov. 6, 2020 (JP) ................................ 2020-186152

(51) Int. Cl.
*H04W 72/232* (2023.01)
*H04W 72/1273* (2023.01)
*H04W 76/28* (2018.01)

(52) U.S. Cl.
CPC ..... *H04W 72/232* (2023.01); *H04W 72/1273* (2013.01); *H04W 76/28* (2018.02)

(58) Field of Classification Search
CPC .......... H04W 72/232; H04W 72/1273; H04W 76/28; H04W 72/23; H04L 5/0044;
(Continued)

(56) References Cited

U.S. PATENT DOCUMENTS

2019/0222400 A1* 7/2019 Bagheri ................ H04L 5/0082
2020/0382354 A1* 12/2020 Sengupta ................ H04L 5/001
(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Hoang-Chuong Q Vu
(74) *Attorney, Agent, or Firm* — Osha Bergman Watanabe & Burton LLP

(57) ABSTRACT

To appropriately perform communication even when transmission with repetition is applied to DL channels transmitted from one or more TRPs. A terminal according to an aspect of the present disclosure includes a receiving section that receives multiple downlink control information transmitted using respective downlink control channels to which transmission with repetition is applied; and a control section that controls, when a downlink shared channel overlaps a resource in a control resource set including a downlink control channel to which the transmission with repetition is applied, not to use resources corresponding to a downlink control channel scheduling the downlink shared channel and a demodulation reference signal resource for an associated downlink control channel, for the downlink shared channel.

5 Claims, 9 Drawing Sheets

(58) Field of Classification Search
CPC ....... H04L 5/0048; H04L 1/08; H04L 5/0053; H04L 27/26
See application file for complete search history.

(56) References Cited

U.S. PATENT DOCUMENTS

| | | | | |
|---|---|---|---|---|
| 2021/0127398 A1* | 4/2021 | Nam | H04W 72/23 | |
| 2021/0195600 A1* | 6/2021 | Khoshnevisan | H04W 72/53 | |
| 2022/0159772 A1* | 5/2022 | Raghavan | H04W 76/20 | |
| 2022/0209917 A1* | 6/2022 | Ren | H04L 5/0064 | |
| 2023/0140213 A1* | 5/2023 | Awadin | H04L 5/0044 | 370/329 |
| 2023/0328744 A1* | 10/2023 | Singh | H04L 5/0053 | 370/329 |

OTHER PUBLICATIONS

International Search Report issued in corresponding International Application No. PCT/JP2021/040323, mailed on Jan. 25, 2022 (9 pages).

Written Opinion issued in corresponding International Application No. PCT/JP2021/040323, mailed on Jan. 25, 2022 (5 pages).

Vivo; "Enhancements on Multi-TRP for PDCCH, PUCCH and PUSCH"; 3GPP TSG RAN WG1 #104b-e, R1-2102507; e-Meeting; Apr. 12-20, 2021 (29 pages).

NTT Docomo, Inc.; "Discussion on MTRP for reliability"; 3GPP TSG RAN WG1 #104bis-e, R1-2103560; e-Meeting; Apr. 12-20, 2021 (21 pages).

* cited by examiner

SINGLE MODE
TRP2
TRP1
control
data
UE

SINGLE MASTER MODE
TRP2
data
TRP1
control
data
UE

MASTER SLAVE MODE
TRP2
data
control part 1
control part 2
TRP1
data
UE

MULTI-MASTER MODE
TRP2
data
control
control
TRP1
data
UE

TERMINAL, RADIO COMMUNICATION METHOD, BASE STATION, AND SYSTEM FOR CONTROLLING PHYSICAL DOWNLINK CONTROL CHANNEL WITH REPETITION

TECHNICAL FIELD

The present disclosure relates to a terminal, and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is studied that one or a plurality of transmission/reception points (TRP) (multi-TRP) use one or a plurality of panels (multi-panel) to perform DL transmission (for example, PDSCH transmission) to a terminal (user terminal, User Equipment (UE)).

In NR, transmission with repetition is assumed to be applied to a given channel (for example, PCDDH). For example, it is conceivable that a plurality of PDCCHs to which the transmission with repetition is applied from the multi-panel/TRP are used to control scheduling of DL transmission/UL transmission.

However, in NR specification so far, how to control the transmission with repetition from one or more TRPs has not been sufficiently studied.

In view of these, an object of the present disclosure is to provide a terminal, a radio communication method, and a base station that can appropriately perform communication even when transmission with repetition is applied to DL channels transmitted from one or more TRPs.

Solution to Problem

A terminal according to an aspect of the present disclosure includes aa receiving section that receives multiple downlink control information transmitted using respective downlink control channels to which transmission with repetition is applied; and a control section that, when a downlink shared channel overlaps a resource in a control resource set including a downlink control channel to which the transmission with repetition is applied, controls not to use resources corresponding to a downlink control channel scheduling the downlink shared channel and a demodulation reference signal for an associated downlink control channel, for the downlink shared channel.

Advantageous Effects of Invention

According to an aspect of the present disclosure, communication can be appropriately performed even when transmission with repetition is applied to DL channels transmitted from one or more TRPs.

DESCRIPTION OF EMBODIMENTS

Time Domain Resource Allocation

In existing systems (for example, Rel. 15), time domain resource allocation information for a physical shared channel (at least one of a PDSCH and a PUSCH) is included in downlink control information (DCI). A network (for example, a base station) uses a given field included in the DCI (for example, a TDRA field) to notify a UE of information related to a time domain resource where the physical shared channel scheduled by the DCI is scheduled.

The information related to the time domain resource may include, for example, at least one of information indicating an offset between the DCI and the physical shared channel (for example, a slot offset K0), information indicating a starting symbol (for example, a starting symbol S), and information indicating a length of the physical shared channel (for example, a length L).

Each of bit information (or codepoints) notified with the TDRA field may be associated with different time domain resource allocation candidates (or, entries) respectively. For example, a table (for example, a TDRA table) may be defined in which each of bit information and the time domain resource allocation candidates (K0, S, L) are associated with each other. The time domain resource allocation candidates may be predefined by a specification, or may be informed/configured for the UE by higher layer signaling.

PDSCH

The UE may determine a row index (an entry number or an entry index) in a given table based on a value of the TDRA field in the DCI (for example, DCI format 1_0/1_1/1_2). The given table may include at least one of information indicating a time offset between the DCI and the PDSCH scheduled by the DCI (for example, a slot offset K0), information indicating a mapping type of the PDSCH, the starting symbol S and time length L of the PDSCH. A combination of the starting symbol S and the time length L of the PDSCH may be referred to as a start and length indicator (SLIV).

Figure 1:
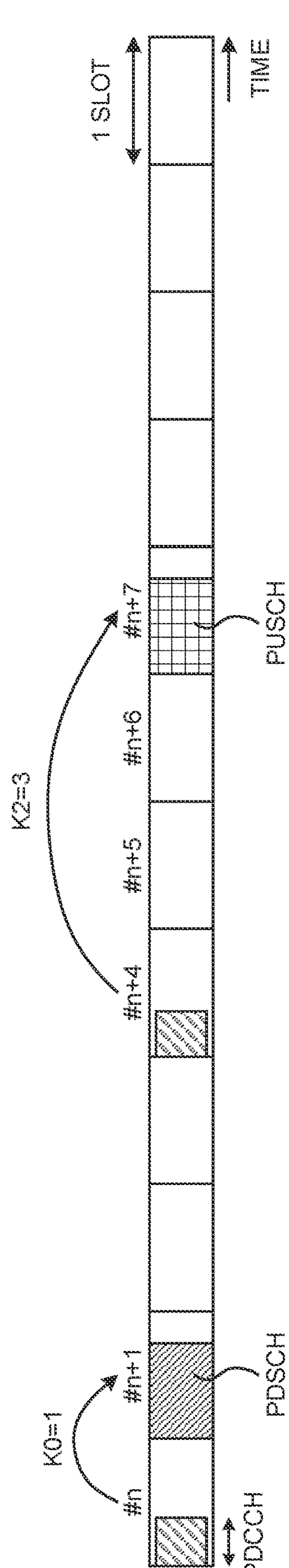
FIG. 1 is a diagram to show an example of schedule control of a physical shared channel based on PDCCH/DCI.
Figure 1:

The UE may determine the time domain resource where the PDSCH is scheduled based on a value of the given field included in the DCI and at least one of the slot offset K0 information, mapping type, starting symbol S, symbol length L, and SLIV defined in the table (see FIG. 1). Note that a reference point for the starting symbol S and the symbol length L may be controlled based on a start position (a first symbol) of the slot. The starting symbol S, the symbol length L, and the like may be defined depending on the mapping type of the PDSCH.

As shown in FIG. 1, the UE determines a slot where the PDSCH is scheduled by use of the DCI (or the PDCCH used for transmission of the DCI) in the time domain as a reference point. For example, in a case of receiving the DCI scheduling the PDSCH in slot #n, the UE may determine a slot receiving the PDSCH (a slot allocated to the PDSCH) based on at least one of the number n of the slot, a PDSCH subcarrier spacing $P_{PDSCH}$, a PDCCH subcarrier spacing $P_{PDCCH}$, and the time offset K0 described above. Here, a case is shown that the slot offset K0=1 and the PDSCH subcarrier spacing is the same as the PDCCH subcarrier spacing.

For the resource allocation information (for example, the SLIV) specified in the TDRA field, the UE determines allocation of a PDSCH on the basis of a start point of a slot where the PDSCH is allocated. Note that the reference point may be referred to as a basis or point of reference.

PUSCH

The UE may determine a row index (an entry number or an entry index) in a given table based on a value of the TDRA field in the DCI (for example, DCI format 0_0/0_1/0_2). The given table may include at least one of information indicating a time offset between the DCI and the PUSCH scheduled by the DCI (for example, a slot offset K2), information indicating a mapping type of the PUSCH, and the starting symbol S and time length L of the PUSCH. A combination of the starting symbol S and the time length L of the PUSCH may be referred to as a start and length indicator (SLIV).

The UE may determine the time domain resource where the PUSCH is scheduled based on a value of the given field included in the DCI and at least one of the slot offset K2 information, mapping type, starting symbol S, symbol length L, and SLIV defined in the table (see FIG. 1). Note that a reference point for the starting symbol S and the symbol length L may be controlled based on a start position (a beginning symbol) of the slot. The starting symbol S, the symbol length L, and the like may be defined depending on the mapping type of the PDSCH.

As shown in FIG. 1, the UE determines a slot where the PUSCH is scheduled by use of the DCI (or the PDCCH used for transmission of the DCI) in the time domain as a reference point. For example, in a case of receiving the DCI scheduling the PUSCH in slot #n+4, the UE may determine a slot transmitting the PUSCH (or a slot allocated to the PUSCH) based on at least one of the number n+4 of the slot, a PUSCH subcarrier spacing $\mu_{PDSCH}$, a PUCCH subcarrier spacing $P_{PUSCH}$, and the time offset K2 described above. Here, a case is shown that the slot offset K2=3 and the PDSCH subcarrier spacing is the same as the PDCCH subcarrier spacing.

For the resource allocation information (for example, the SLIV) specified in the TDRA field, the UE determines allocation of a PUSCH on the basis of a start point of a slot where the PUSCH is allocated.

Multi-TRP

For NR, a study is underway that one or a plurality of transmission/reception points (TRPs) (multi-TRP) use one or a plurality of panels (multi-panel) to perform DL transmission to the UE. Performing UL transmission to one or the plurality of TRPs by the UE is also under study.

Note that the plurality of TRPs may correspond to the same cell identifier (cell ID), or different cell IDs. The cell ID may be a physical cell ID, or a virtual cell ID.

FIGS. 2A to 2D are diagrams to show examples of a multi-TRP scenario. In these examples, assume that each TRP can transmit four different beams, without limitation.

Figures 2A, 2B, 2C, 2D:
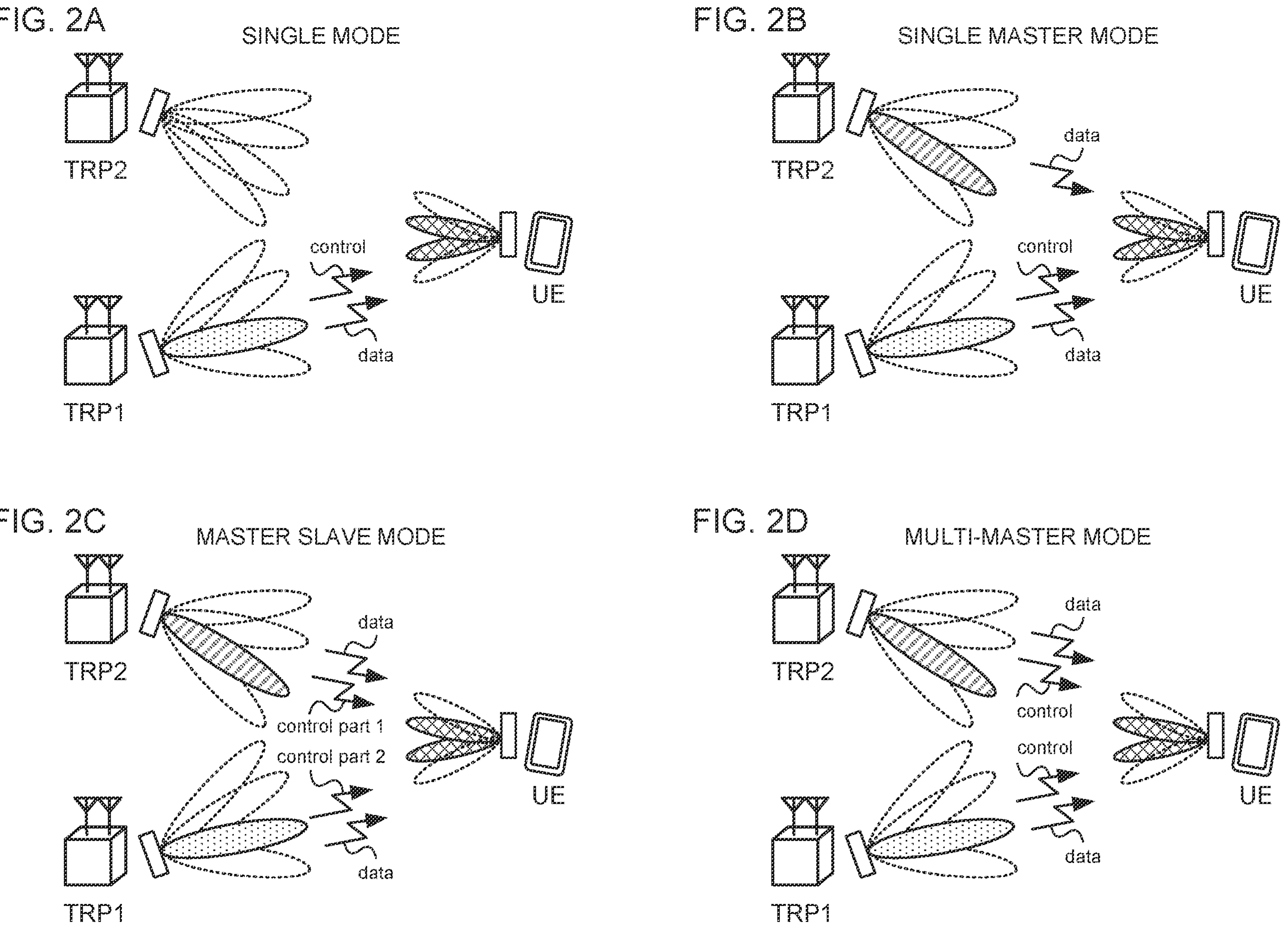
FIGS. 2A to 2D are diagrams to show examples of a multi-TRP scenario.

FIG. 2A shows an example of a case where only one TRP (or a TRP 1 in this example) of the multi-TRP performs transmission to the UE (the case may be referred to as a single mode, a single TRP, or the like). In this case, the TRP 1 transmits both a control signal (PDCCH) and a data signal (PDSCH) to the UE.

FIG. 2B shows an example of a case where only one TRP (or the TRP 1 in this example) of the multi-TRP transmits the control signal to the UE, and the multi-TRP transmit the data signals (the case may be referred to as a single master mode). The UE receives each of the PDSCHs transmitted from the multi-TRP based on single downlink control information (DCI).

FIG. 2C shows an example of a case where each of the multi-TRP transmits a part of the control signals to the UE, and the multi-TRP transmits the data signals (the case may be referred to as a master slave mode). The TRP 1 may transmits a part 1 of the control signal (DCI), and the TRP 2 may transmits a part 2 of the control signal (DCI). The part 2 of the control signal may depend on the part 1. The UE receives each of the PDSCHs transmitted from the multi-TRP based on these parts of the DCI.

FIG. 2D shows an example of a case where each of the multi-TRP transmits a different control signal to the UE, and the multi-TRP transmits the data signals (the case may be referred to as a multi-master mode). The TRP 1 may transmits a first control signal (DCI), and the TRP 2 may transmits a second control signal (DCI). The UE receives each of the PDSCHs transmitted from the multi-TRP based on these DCI.

In the case, as shown in FIG. 2B, that a plurality of PDSCHs (which may be referred to as multi-PDSCH (multiple PDSCHs)) from the multi-TRP are scheduled using one piece of DCI, the DCI may be referred to as single DCI (S-DCI, single PDCCH). In the case, as shown in FIG. 2D, that a plurality of PDSCHs from the multi-TRP are scheduled using a plurality of pieces of DCI, the plurality of these pieces of DCI may be referred to as multi-DCI (M-DCI, multi-PDCCH (multiple PDCCHs)).

Codewords (Code Word (CW)) different from each other and layers different from each other may be transmitted from the respective TRPs of the multi-TRP. A non-coherent joint transmission (NCJT) is under study as one mode of multi-TRP transmission.

In NCJT, for example, the TRP 1 performs modulation mapping on a first codeword, and transmits a first PDSCH using a first precoding of a first number of layers (for example, two layers) by layer mapping. The TRP 2 performs modulation mapping on a second codeword, and transmits a second PDSCH using a second precoding of a second number of layers (for example, two layers) by layer mapping.

Note that a plurality of PDSCHs (multi-PDSCH) transmitted by NCJT may be defined to partially or fully overlap in at least one of the time and frequency domains. In other words, the first PDSCH from a first TRP and the second PDSCH from a second TRP may overlap each other in at least one of the time and frequency resources.

These first and second PDSCHs may be assumed to be not in a quasi-co-location (QCL) relation (not quasi-co-located). A reception of the multi-PDSCH may be interpreted as simultaneous reception of PDSCH that is not a certain QCL type (for example, QCL type D).

Supporting PDSCH (transport block (TB) or codeword (CW)) repetition across multi-TRP in URLLC for the multi-TRP is under study. Supporting repetition scheme across multi-TRP in the frequency domain or the layer (spatial) domain or the time domain (URLLC scheme, for example, scheme 1, 2a, 2b, 3, 4) is under study. In the scheme 1, the multi-PDSCH from the multi-TRP is space division multiplexed (SDMed). In the schemes 2a and 2b, the PDSCH from the multi-TRP is frequency division multiplexed (FDMed). In the scheme 2a, the redundancy versions (RVs) are the same for the multi-TRP. In the scheme 2b, the RVs may be the same or different from each other for the multi-TRP. In the schemes 3 and 4, the multi-PDSCH from the multi-TRP is time division multiplexed (TDMed). In the scheme 3, the multi-PDSCH from the multi-TRP is transmitted in one slot. In the scheme 4, the multi-PDSCH from the multi-TRP is transmitted in different slots.

According to such a multi-TRP scenario, a more flexible transmission control using a good quality channel is enabled.

NCJT using the multi-TRP/panel may use a high rank. Both the single DCI (single PDCCH, for example, in FIG. 2B) and the multi-DCI (multi-PDCCH, for example, in FIG. 2D) may be supported to support ideal and non-ideal backhauls between the plurality of TRPs. The maximum number of TRPs may be two for both the single DCI and the multi-DCI.

TCI enhancement is under study for the single PDCCH design (mainly for the ideal backhaul). Each TCI codepoint in the DCI may correspond to one or two TCI states. A TCI field size may be the same as that in Rel. 15.

Here, in Rel. 17 or later versions, it is also assumed that transmission with repetition (PDCCH repetition) is applied to the PDCCH (or DCI) transmitted from one or more TRPs. For example, it is assumed that scheduling or transmission/reception indication of one or more signals/channels is performed using a plurality of PDCCHs (or DCIs) transmitted from one or more TRPs.

The PDCCH/DCI to which the transmission with repetition is applied may be referred to as multi-PDCCH/multi-DCI. The transmission of PDCCH repetition may be interpreted as PDCCH repetition, a plurality of PDCCH transmissions, multi-PDCCH transmission, or multiple PDCCH transmissions.

The multi-PDCCH/multi-DCI may be transmitted from different TRPs. The multi-PDCCH/DCI may be multiplexed by using time division multiplexing (TDM)/frequency division multiplexing (FDM)/spatial division multiplexing (SDM). For example, in a case where the PDCCH repetition by way of the time division multiplexing (TDM PDCCH repetition) is performed, the PDCCHs transmitted from different TRPs are allocated to different time domains.

Assume a case where the multi-PDCCH/DCI is used to schedule one or more physical shared channels. One or more physical shared channels may be, for example, the same (or one) physical shared channel, or may be a plurality of physical shared channels scheduled in the same time domain. In such a case, an issue is how to control schedule control (for example, content informed by each of DCI, a reference point upon scheduling, or the like).

For example, in a case where contents of the DCI transmitted on respective PDCCHs in the different time domains (for example, DCI payload/coded bit/the number of CCEs) are the same, an issue is how the UE applies/interprets each of PDCCH/DCI to control transmission processing or reception processing. As an example, an issue is how the UE applies/interprets time relation indication of each of PDCCH/DCI (for example, the same value) to control the schedule.

Figure 3:
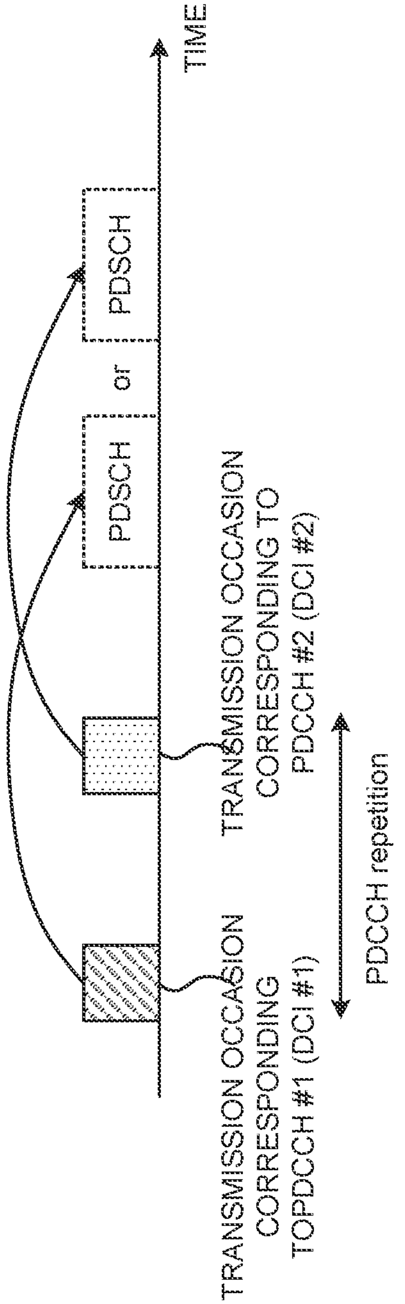
FIG. 3 is a diagram to show an example of transmission of PDCCH repetition.

FIG. 3 shows an example of a case where a PDCCH schedules one PDSCH (for example, the same PDSCH) by transmission with repetition.

In this case, a scheduling of the physical shared channel may be controlled based on timing related information (for example, the time domain resource allocation information) included in the respective PDCCHs/DCIs transmitted in the different time domains (for example, different slots/symbols). The PDCCHs transmitted in the different time domains may be configured to schedule the same transport block (or the physical shared channels transmitting the same transport block).

However, in the case where a plurality of PDCCHs/DCIs are used to perform scheduling, an issue is how to control configuration or interpretation in the UE of the timing related information (for example, the time domain resource allocation information) included in each of PDCCH/DCI.

For example, in a case of applying/interpreting the timing related information (for example, the same value/same payload) included in each of PDCCH/DCI by use of each of PDCCH/DCI as a reference, the UE may not appropriately grasp one PDSCH scheduled by the PDCCH repetition (for example, transmitting/receiving timing) (see FIG. 3).

The inventors of the present invention studied how to perform determination of a PDCCH/DCI/control resource set as a reference(basis), or perform control based on a PDCCH/DCI/control resource set as a reference(basis) in one or more cases that the PDCCH repetition (for example, a plurality of PDCCHs/DCIs) is used to perform the transmission processing/reception processing, and came up with the idea of the present embodiments.

Hereinafter, embodiments according to the present disclosure will be described in detail with reference to the drawings. Note that following respective aspects (for example, respective cases) may be used individually alone, or at least two of the aspects may be combined and applied.

In the present disclosure, "A/B" may be interpreted as at least one of A and B, and "A/B/C" may be interpreted as at least one of A, B, and C.

Radio Communication Method

In the present embodiment, a case where the DCI having the same payload content (same DCI payload content) is transmitted by the PDCCH repetition transmitted in the different time domains (TDM PDCCH repetitions) is described as an example. In other words, this case corresponds to a case where the same DCI payload content is notified to the UE by the respective multi-PDCCH. Note that the present embodiment is not limited to the above case, but may be applied to a case where transmission of the DCI having the different payload content (different DCI payload content) is supported/permitted by the PDCCH repetition transmitted in different time domains.

The same payload content may correspond to a case where values of all fields included in the respective DCIs are set to be the same. Alternatively, the same payload content may also correspond to a case where values of some given fields of the fields included in the respective DCIs are set to be the same.

The given fields may be a notification field of the time related information. The time related information may be interpreted as timing related information, time related indication, or timing related indication, for example. For example, the given fields may be at least one of a time domain resource allocation (for example, time domain resource assignment) field and an HARQ-ACK feedback timing indication (for example, PDSCH-to-HARQ feedback timing indicator) field.

In a case where a given physical shared channel is scheduled by multiple DCIs transmitted on the respective PDCCHs allocated to the different time domains, and contents of the multiple DCIs (for example, payload contents) are the same, the UE may interpret/apply the time related information (or the timing related information) included in the DCI based on a certain time reference.

The time reference may be interpreted as a timing reference, a reference timing, a reference point, a time reference point, a reference(basis) in a time domain, or a reference point in a time domain. The time reference may be interpreted as a reference of other parameter than a time.

The certain time reference may be a certain PDCCH (or a transmitting timing of a certain PDCCH) of a plurality of PDCCHs repeatedly transmitted. For example, in one or more cases that the PDCCH repetition (for example, a plurality of PDCCH/DCI) is used to perform the transmission processing/reception processing, the UE may apply at least one of the following references A1 to A8 as the certain time reference to detection/reception of a PDCCH corresponding to the DCI, or schedule of a DL channel/UL channel/RS. In other words, the UE may determine which PDCCH/DCI of the PDCCH/DCI received repeatedly a plurality of times is referenced (or a value of which DCI is indicated) based on at least one of the following references A1 to A8.

Reference A1: The first/last PDCCH in a time domain (first/last PDCCH repetition in time domain)

Reference A2: The first/last PDCCH in a frequency domain (first/last PDCCH repetition in frequency domain)

Reference A3: A PDCCH with the lowest TCI state ID/highest TCI state ID (PDCCH repetition with lowest/highest TCI state ID)

Reference A4: A PDCCH with the lowest CORESET pool ID (or TRP ID)/highest CORESET pool ID (or TRP ID) (PDCCH repetition with lowest/highest CORESET Pool ID (TRP ID))

Reference A5: A PDCCH with the lowest control resource set ID/highest control resource set ID (PDCCH repetition with lowest/highest CORESET ID)

Reference A6: A PDCCH with the lowest search space index/highest search space index (PDCCH repetition with lowest/highest search space index)

Reference A7: A PDCCH with the lowest monitoring occasion/highest monitoring occasion (PDCCH repetition with lowest/highest monitoring occasion)

Reference A8: A combination of any of A1 to A7

The reference A1 corresponds to a case where, for example, a PDCCH firstly transmitted (or received) in the PDCCH repetition or a PDCCH firstly allocated in the time domain is the certain time reference. The UE may use a first symbol of the firstly transmitted PDCCH as the particular time reference, or may use the last symbol of the PDCCH as the certain time reference. Alternatively, a PDCCH lastly transmitted (or received) in the PDCCH repetition or a PDCCH lastly allocated to the time domain may be the certain time reference.

In the reference A2, for example, a PDCCH with the lowest control channel element (CCE) index/highest CCE index in the PDCCH repetition may be the certain time reference. Alternatively, a PDCCH with the lowest PDCCH candidate index/highest PDCCH candidate index in the PDCCH repetition may be the certain time reference.

In the reference A8, for example, a PDCCH firstly transmitted in the time domain of the PDCCHs with the lowest CORESET pool ID in combination of A1 and A4 may be the certain time reference.

Note that the certain time reference may be determined not based on the PDCCH/DCI but on the control resource set corresponding to the PDCCH. For example, in one or more cases that the PDCCH repetition in a plurality of control resource sets is used to perform the transmission processing/reception processing, the UE may apply at least one of the following references B1 to B8 as a control resource set to be a reference for detection/reception of a PDCCH corresponding to the DCI, or schedule of a DL channel/UL channel/RS. In other words, the UE may determine which control resource set of the PDCCH/DCI received repeatedly a plurality of times (for example, in a case of control resource set repetition) is referenced (or a value of DCI of which control resource set is indicated) based on at least one of the following references B1 to B8.

Reference B1: A control resource set of the first PDCCH repetition/last PDCCH repetition in a time domain (CORESET of first/last PDCCH repetition in time domain)

Reference B2: A control resource set of the first PDCCH repetition/last PDCCH repetition in a frequency domain (CORESET of first/last PDCCH repetition in frequency domain)

Reference B3: A control resource set with the lowest resource block (or resource block group)/highest resource block (or resource block group) (CORESET with lowest lowest/highest RB/RBG)

Reference B4: A control resource set with the lowest TCI state ID/highest TCI state ID (CORESET with lowest/highest TCI state ID)

Reference B5: A control resource set with the lowest CORESET pool ID (or TRP ID)/highest CORESET pool ID (or TRP ID) (CORESET with lowest/highest CORESET Pool ID (TRP ID))

Reference B6: A control resource set with the lowest control resource set ID/highest control resource set ID (CORESET with lowest/highest CORESET ID)

Reference B7: A control resource set with the lowest search space index/highest search space index (CORESET associated with lowest/highest search space index)

Reference B8: A combination of any of B1 to B7

In the reference B8, for example, a control resource set with the lowest control resource set ID of the PDCCH with the lowest CORESET pool ID in combination of B5 and B6 may be a reference (for example, the certain time reference).

An interval between the multi-PDCCH (or the multi-DCI) to which the transmission with repetition is applied may be configured in association for a given transmission parameter (or between one or more given transmission parameters). The given transmission parameters may be at least one of a control channel element (CCE), a resource element group (REG), a search space, a search space set, and a CORESET.

For example, the given transmission parameter may be configured in association between the PDCCH used as the time reference (for example, the PDCCH firstly transmitted in the transmission with repetition) and another PDCCH. As an example, the given transmission parameter may be configured based on a repetition order (or in association with a transmission order) between the transmission parameters for a plurality of PDCCHs to which the repetition is applied. The UE can determine the transmission order of the respective PDCCHs (for example, the PDCCH firstly transmitted) based on information related to PDCCH repetition (for example, the number of repetition times, repetition period, or the like) and the transmission parameter corresponding to each PDCCH.

Application Case

The present embodiment may be applied in at least one of the following cases 0 to 13 as the one or more cases that the PDCCH repetition (for example, a plurality of PDCCHs/DCIs) is used to perform the transmission processing/reception processing.

Case 0

The references A1 to A8 (hereinafter, simply described as the reference A)/references B1 to B8 (hereinafter, simply described as the reference B) may be applied to the control of the transmitting timing (for example, the time domain resource) of the physical shared channel (for example, PDSCH/PUSCH) scheduled using the PDCCH/DCI repetition.

For example, the UE may determine the time domain resource of a signal/channel (for example, a physical shared channel) scheduled by each of DCI based on the certain time reference and the notification field of the time related information included in each of DCI (or at least one of DCI).

For example, in a case where the slot offsets K0/K2 specified by each of DCI have the same value (for example, K0=2), the UE may determine that a PDSCH/PUSCH is scheduled in a slot away by K0/K2 from the certain time reference.

Group Common DCI

The reference A/reference B may be applied to the control of the transmission processing/reception processing based on group common DCI, for example. The group common DCI may be, for example, DCI format 2_0 (case 1), DCI format 2_1 (case 2), DCI format 2_4 (case 3), or DCI format 2_5 in Rel. 16 or later versions. Of course, applicable group common DCI format is not limited to the above.

Case 1

DCI format 2_0 is used for notification of a slot format. For example, the UE determines a slot format (for example, a transmission direction of each symbol (for example, UL/DL/flexible)) for the given number of slots in a DL BWP/UL BWP based on a value of a field of DCI format 2_0 (for example, a SFI index field).

In this manner, in a case where the PDCCH repetition is used to transmit a plurality of DCI formats 2_0, an issue is from which position (for example, from which slot) information of the slot format notified by DCI format 2_0 starts.

Then, in the present embodiment, in the case where the PDCCH repetition (or the PDCCH repeatedly transmitted) is used to transmit a plurality of DCI formats 2_0, the UE may control the transmission processing/reception processing based on the reference A/reference B.

Figure 4:
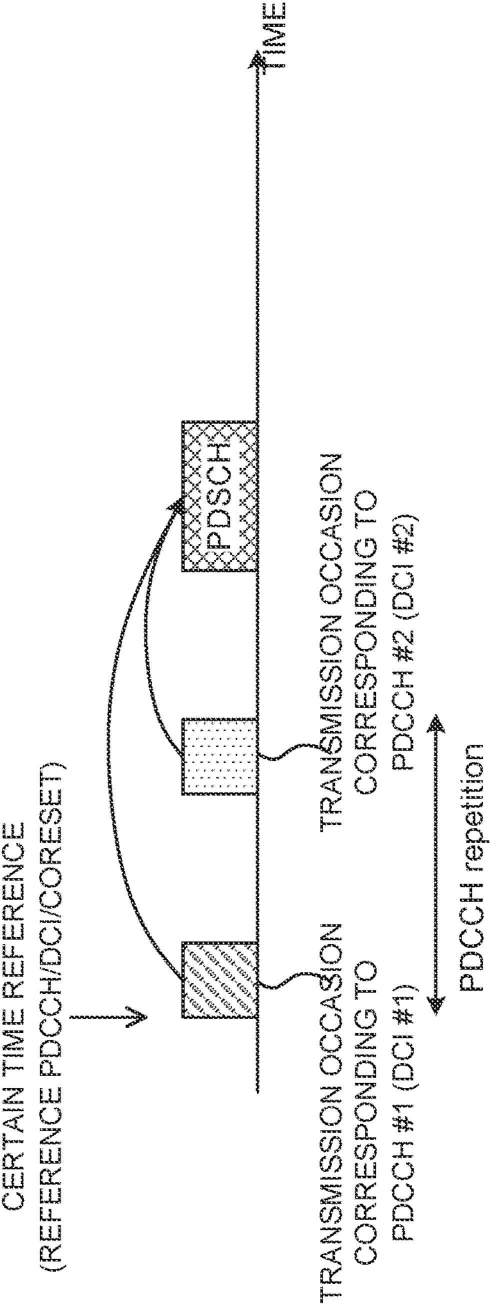
FIG. 4 is a diagram to show an example of communication control using PDCCH repetition in the present embodiment.

For example, the UE may apply/interpret the slot format information notified by DCI format 2_0 to control the transmission processing/reception processing based on the certain time reference (for example, the reference A/reference B) (see FIG. 4). FIG. 4 shows a case where in the PDCCH repetition (here, PDCCH #1 (DCI #1) and PDCCH #2 (DCI #2)), PDCCH #1 (DCI #1) is used as a certain reference (for example, the first repetition PDCCH in the reference A1).

This allows the UE to appropriately determine the slot format even when a plurality of DCI formats 2_0 are repeatedly transmitted.

Case 2

DCI format 2_1 is used to notify a resource block (for example, PRB) and a symbol that it may be presumed that the UE does not intend to transmit. For example, the UE may determine a resource block (for example, PRB) and symbol of which transmission is not intended, based on information included in DCI format 2_1 (for example, pre-emption indication). For example, in a case of detecting DCI format 2_1, the UE may assume, from a set of PRB and symbol in the last monitoring period, that there is no transmission to the UE in a set of symbols notified by DCI format 2_1.

In a case where UE detects DCI format 2_1 in the PDCCH transmitted by the control resource set in the slot, a set of symbols are the last $$N_{symb}^{slot} \cdot T_{INT} \cdot 2^{\mu-\mu INT}$$

symbols before the first symbol in the control resource set in the slot. $T_{INT}$ corresponds to a PDCCH monitoring period provided by higher layer signaling, $$N_{symb}^{slot}$$

corresponds to the number of symbols per slot, p corresponds to a subcarrier spacing configuration (SCS configuration) for a serving cell with mapping to a respective field in the DCI format 2_1, and $P_{INT}$ corresponds to a subcarrier spacing configuration for a DL BWP in which the UE received the PDCCH in DCI format 2_1.

In this manner, in the case where the PDCCH repetition is used to transmit a plurality of DCI formats 2_1, an issue is which control resource set the information notified by DCI format 2_1 is applied/interpreted based on.

Then, in the present embodiment, in the case where the PDCCH repetition (or the PDCCH repeatedly transmitted) is used to transmit a plurality of DCI formats 2_1, the UE may control the transmission processing/reception processing based on the reference A/reference B.

For example, the UE applies/interprets the information notified by DCI format 2_1 to control the transmission processing/reception processing, based on the certain control resource set (for example, the reference B). This allows the UE to appropriately control communication even when a plurality of DCI formats 2_1 are repeatedly transmitted.

Case 3

DCI format 2_4 is used to notify a PRB and symbol of which the corresponding UL transmission is to be canceled. For example, the UE may determine a PRB and symbol of which UL transmission is canceled based on the information included in DCI format 2_4 (for example, cancellation indication).

The indication by DCI format 2_4 may be applied to PUSCH transmission/SRS transmission. In a case where the PUSCH transmission/SRS transmission is scheduled by the DCI format, the indication by DCI format 2_4 is applied to the PUSCH transmission or the SRS transmission only in a case where the last symbol of PDCCH reception corresponding to the DCI format is earlier than the first symbol of PDCCH reception corresponding to DCI format 2_4.

The UE may apply/interpret the information notified by DCI format 2_4 to control the PUSCH transmission/SRS transmission, based on the last timing of the PDCCH reception in which DCI format 2_4 is detected/the last symbol of the control resource set in which DCI format 2_4 is detected.

The UE does not expect to cancel the PUSCH transmission or the SRS transmission before a given symbol after the last symbol of the control resource set in which DCI format 2_4 is detected.

In this manner, in the case where the PDCCH repetition is used to transmit a plurality of DCI formats 2_4, an issue is which PDCCH reception/control resource set the information notified by DCI format 2_4 is applied/interpreted based on.

Then, in the present embodiment, in the case where the PDCCH repetition (or the PDCCH repeatedly transmitted) is used to transmit a plurality of DCI formats 2_4, the UE may control the transmission processing/reception processing based on the reference A/reference B.

For example, the UE applies/interprets the information notified by DCI format 2_4 to control the transmission processing/reception processing, based on the certain time reference (for example, the reference A/reference B). This allows the UE to appropriately control communication even when a plurality of DCI formats 2_4 are repeatedly transmitted.

Different time references may be applied to the PDCCH reception corresponding to the DCI format scheduling the PUSCH transmission/SRS transmission and the PDCCH reception corresponding to DCI format 2_4.

Case 4

DCI format 2_5 is used for notification of soft resource availability. For example, the UE may determine an available soft resource based on a value of information included in DCI format 2_5 (for example, an availability notification (Availability Indicator (AI))).

Utilizing IAB (Integrated Access Backhaul) technique by using a NR communication as a backhaul between base stations (or between a base station and a relay station) is under study. Particularly, IAB using the NR communication using millimeter waves is expected to be able to expand a coverage area at a low cost.

An IAB node may have at least one function such as a DU (Distribution Unit), a CU (Central Unit), and an MT (Mobile Termination). Therefore, the IAB node may serve as a base station or a user terminal (UE: User Equipment).

A value of an availability notification (for example, AI index) field in DCI format 2_5 indicates to the IAB-DU a soft symbol availability in each slot for the number of slots starting from the earliest slot of the IAB-DU which overlaps in time with the slot of the IAB node where the IAB-DU detects DCI format 2_5. The number of slots is equal to or larger than the PDCCH monitoring period in DCI format 2_5 provided by a higher layer parameter for the search space.

In this manner, in the case where the PDCCH repetition is used to transmit a plurality of DCI formats 2_5, an issue is at which position the slot where DCI format 2_5 is detected is.

Then, in the present embodiment, in the case where the PDCCH repetition (or the PDCCH repeatedly transmitted) is used to transmit a plurality of DCI formats 2_5, the UE may control the transmission processing/reception processing based on the reference A/reference B.

For example, the UE applies/interprets the information notified by DCI format 2_5 to control the transmission processing/reception processing, based on the certain time reference (for example, the reference A/reference B). This allows the UE to appropriately control communication even when a plurality of DCI formats 2_5 are repeatedly transmitted.

PDSCH/PUSCH Scheduling

The reference A/reference B may be applied to the control of the transmission processing/reception processing based on the DCI/PDCCH used for a PDSCH/PUSCH scheduling operation. The PDSCH/PUSCH scheduling operation may be resource (for example, frequency resource) allocation (case 5), scheduling limitation for PDSCH (case 6), and in/out-of-order (case 7) for PDSCH/PUSCH.

Case 5

PDSCH resource (for example, RB) allocation is determined based on a control resource set in which the UE receives the DCI. For example, in a type of PDCCH common search space, in a case where a PDSCH is scheduled by DCI format 1_0, resource block numbering (RB numbering) is started from the lowest RB of the control resource set where the DCI is received regardless of which bandwidth part is an active BWP. In other cases, the RB numbering is started from the lowest RB in a determined DL BWP (a given BWP).

In this manner, in a case where the PDCCH repetition is used to transmit a plurality of DCI formats including the frequency domain resource allocation information, an issue is which DCI (or control resource set) the resource allocation is controlled based on, for example, an RB of which DCI/control resource set the RB numbering is started based on.

Then, in the present embodiment, in the case where the PDCCH repetition (or the PDCCH repeatedly transmitted) is used to transmit a plurality of DCI formats including the frequency domain resource allocation information, the UE may control the transmission processing/reception processing (for example, determining an allocation resource) based on the reference A/reference B.

For example, the UE may determine the frequency domain resource allocation based on the PDCCH/DCI/control resource set determined based on the certain time reference (for example, the reference A/reference B). This allows the UE to appropriately determine the PDSCH frequency domain resource even when a plurality of DCI formats including the PDSCH frequency domain resource related information are repeatedly transmitted.

The PUSCH resource (for example, RB) allocation is determined based on the CCE index of the PDCCH in the DCI detected by the UE. For example, for DCI format 0_0 monitored in a common search space CRC-scrambled by an RNTI other than a given RNTI (for example, a TC-RNTI), the uplink RB set may be an RB set with the lowest index amongst uplink RB sets that intersect the CCE with lowest-index of the PDCCH in which the UE detects DCI 0_0 in the active DL BWP. In a case where there is no intersect, the uplink RB set may be an RB set 0 in the active UL BWP.

In the case where the PDCCH repetition is used to transmit a plurality of DCI formats including the frequency domain resource allocation information, an issue is a PDCCH corresponding to which DCI the resource allocation is controlled based on, for example, the lowest CCE of a PDCCH corresponding to which DCI the RB set is determined based on.

Then, in the present embodiment, in the case where the PDCCH repetition (or the PDCCH repeatedly transmitted) is used to transmit a plurality of DCI formats including the frequency domain resource allocation information, the UE may control the transmission processing/reception processing (for example, determining an allocation resource) based on the reference A/reference B.

For example, the UE may determine the frequency domain resource allocation (for example, the RB set), based on the PDCCH/DCI determined based on the certain time reference (for example, the reference A/reference B). This allows the UE to appropriately determine the PUSCH frequency domain resource even when a plurality of DCI formats including the PDSCH frequency domain resource related information are repeatedly transmitted.

Case 6

Reception of a PDSCH in a given mapping type is limited depending on a receiving timing of a PDCCH scheduling the PDSCH (for example, relation with PDSCH time allocation). For example, in a case where the first symbol of the PDCCH scheduling the PDSCH is received in a symbol after the first symbol indicated in the PDSCH time domain resource allocation, the UE does not expect to receive a PDSCH of a mapping type B in the slot.

In this manner, in a case where the PDCCH repetition is used to schedule a PDSCH, an issue is a symbol of which PDCCH resource limitation is controlled based on, for example, the first symbol of which PDCCH is compared to the first symbol of the PDSCH time domain resource.

Then, in the present embodiment, in the case where the PDCCH repetition (or the PDCCH repeatedly transmitted) is used to transmit a plurality of DCI formats scheduling the PDSCH, the UE may control the transmission processing/reception processing based on the reference A/reference B.

For example, the UE may control whether to receive the PDSCH of a given mapping type (for example, the mapping type B), based on a symbol of the PDCCH (the first symbol) determined based on the certain time reference (for example, the reference A/reference B). This allows the UE to appropriately determine the reception of the PDSCH even when a plurality of DCI formats used for scheduling the PDSCH are repeatedly transmitted.

Case 7

PDSCH reception processing based on the DCI and PUSCH transmission processing based on the DCI are performed as in-order/out-of-order (in/out-of-order). The in-order corresponds to a case of performing the PDSCH/PUSCH transmission/reception processing in order of receiving the DCI, and the out-of-order corresponds to a case of performing the PDSCH/PUSCH transmission/reception processing not in order of receiving the DCI. Hereinafter, an example of the PDSCH reception processing/PUSCH transmission processing based on the DCI will be described.

For example, a case is assumed that for two HARQ process IDs in a given scheduled cell, the UE is scheduled to start receiving a first PDSCH starting in a symbol j by a PDCCH ending in a symbol i. In this case, the UE may not expect to be scheduled to receive a PDSCH starting earlier than the end of the first PDSCH by a PDCCH that ends later than the symbol i.

The UE, in a given condition, may perform control to decode the PDSCH scheduled by the PDCCH except for a case where the PDCCH scheduling the PDSCH ends at least 14 symbols before the earliest starting symbol of the PDCCH without the corresponding PDSCH transmission.

A case is assumed that for two HARQ process IDs in a given scheduled cell, the UE is scheduled to start receiving a first PDSCH starting in a symbol j by a PDCCH associated with a value of a CORESET pool index ending in a symbol i. In this case, the UE may be scheduled to receive a PDSCH starting earlier than the end of the first PDSCH by a PDCCH associated with a different value of a CORESET pool index ending later than the symbol i.

A case is also assumed that for two HARQ process IDs in a given scheduled cell, the UE is scheduled to start transmitting a first PUSCH starting in a symbol j by a PDCCH ending in a symbol i. In this case, the UE may not expect to be scheduled to transmit a PUSCH starting earlier than the end of the first PUSCH by a PDCCH that ends later than the symbol i.

A case is assumed that for two HARQ process IDs in a given scheduled cell, the UE is scheduled to start transmitting a first PUSCH starting in a symbol j by a PDCCH associated with a value of a CORESET pool index ending in a symbol i. In this case, the UE may be scheduled to transmit a PUSCH starting earlier than the end of the first PDSCH by a PDCCH associated with a different value of a CORESET pool index ending later than the symbol i.

In a case where the end of a symbol i is not at least N2 symbols before the beginning of a symbol j, the UE may expect not to be scheduled by a PDCCH ending in the symbol i to transmit a PUSCH on a serving cell overlapping in time with a given transmission occasion. The given transmission occasion may start in the symbol j on the same serving cell. N2 may represent a value determined based on the UE capability.

In a case where, in a given condition, a gap between the end of a PDCCH in a symbol i and the start of PUSCH transmission in a symbol j is equal to or larger than N2 symbols, the UE may expect to terminate the repetition of the transport block in the PUSCH transmission starting from the symbol j. The given condition may be a case where the UE receives an ACK for a given HARQ process in CG-DFI in the PDCCH ending in the symbol i to terminate repetition in a configured grant-based PUSCH transmission on a given serving cell with the same HARQ process after the symbol i.

In a given condition, the UE may not expect to be scheduled by a PDCCH ending in a symbol i to transmit a PUSCH on a serving cell corresponding to a given HARQ process. The given condition may be a case where there is a transmission occasion for transmitting the configured grant-based PUSCH with the same HARQ process on the same serving cell starting in the symbol j after the symbol i, and the gap between the end of PDCCH symbol and the beginning of the symbol j is smaller than N2 symbols.

As described above, in the PDSCH reception processing/PUSCH transmission processing based on the DCI, the UE performs control using the PDCCH/DCI as a reference (for example, a time reference). In the case where the PDCCH repetition is used to perform the PDSCH reception processing/PUSCH reception processing, an issue is which PDCCH/DCI the control is performed based on.

Then, in the present embodiment, in a case where the PDCCH repetition (or the PDCCH repeatedly transmitted) is used to control the PDSCH reception/PUSCH transmission based on in-order/out-of-order (in/out-of-order), the UE may control the transmission processing/reception processing based on the reference A/reference B. This allows the UE to appropriately control the PDSCH reception processing/PUSCH transmission processing even when a plurality of PDCCH/DCI are repeatedly transmitted.

Case 8

An uplink control channel (for example, PUCCH) resource is determined based on the CCE index corresponding to the PDCCH. For example, in a case where the UE transmit an HARQ-ACK using a PUCCH in response to detection of a DCI format scheduling PDSCH reception/SPS PDSCH release, the UE determines a PUCCH resource having a given index ($r_{PUCCH}$). The given index ($0 \le r_{PUCCH} \le 15$) may be expressed by Equation (1) below.

[Math. 1]

$$r_{PUCCH} = \left\lfloor \frac{2 \cdot n_{CCE,0}}{N_{CCE}} \right\rfloor + 2 \cdot \Delta_{PRI} \quad \text{Equation (1)}$$

$N_{CCE}$ represents the number of CCEs in the control resource set for PDCCH reception corresponding to the DCI format.

$n_{CCE,0}$ represents the first CCE index of the PDCCH reception.

$\Delta_{PRI}$ represents a value of a PUCCH resource identifier field of the DCI format.

In a case where a size of a resource list is larger than a given value (for example, 8) for the first set of the PUCCH resource, the UE determines a PUCCH resource having a given index ($r_{PUCCH}$) in a case of transmitting an HARQ-ACK in response to detecting the last DCI format in the PDCCH repetition. The given index ($0 \le r_{PUCCH} \le R_{PUCCH}-1$) may be expressed by Equation (2) below. The HARQ-ACK transmission may correspond to a PUCCH transmission transmitted in the same slot.

[Math. 2]

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \ge R_{PUCCH} \bmod 8 \end{cases} \quad \text{Equation (2)}$$

$N_{CCE,p}$ represents the number of CCEs in a control resource set p for PDCCH reception corresponding to the DCI format.

$n_{CCE,0}$ represents the first CCE index of the PDCCH reception.

$\Delta_{PRI}$ represents a value of a PUCCH resource identifier field of the DCI format.

In this manner, in a case where the PDCCH repetition is used to transmit a plurality of PDCCHs/DCIs/control resource sets including PUCCH resource information (for example, information of the CCE index), an issue is which PDCCH/DCI/control resource set the PUCCH resource is determine based on.

Then, in the present embodiment, in a case of determining the PUCCH resource corresponding to the PDSCH scheduled using the PDCCH repetition (or the PDCCH repeatedly transmitted) (for example, an HARQ-ACK transmission PUCCH resource corresponding to the PDSCH), the UE may control the transmission processing/reception processing (for example, determine the PUCCH resource) based on the reference A/reference B. The PUCCH corresponding to the PDSCH scheduled using the PDCCH repetition may be interpreted as a PUCCH triggered using the PDCCH repetition.

For example, the UE may determine the PUCCH resource, based on the PDCCH/DCI/control resource set determined based on the certain time reference (for example, the reference A/reference B). As an example, the UE may determine the PUCCH resource using the CCE corresponding to the PDCCH/control resource set determined based on the certain time reference. This allows the UE to appropriately determine the PUCCH resource even when the PDCCH/DCI/control resource set are repeatedly transmitted.

Case 9

A sounding reference signal (SRS) resource is determined based on an SRI (Sounding Reference Indicator) or the PDCCH with the SRI. For example, an SRI indicated in a slot n may be associated with the most recent transmission of an SRS resource identified by the SRI. The SRS resource is allocated/configured before the PDCCH transmitting the SRI.

In this manner, in a case where the PDCCH repetition is used to transmit a plurality of PDCCHs/DCIs including the information related to the SRI, an issue is which PDCCH/DCI the SRS resource is determined based on.

Then, in the present embodiment, in the case where the SRS transmission is controlled based on the PDCCH repetition (or the PDCCH repeatedly transmitted), the UE may control the SRS transmission processing (for example, determining the SRS resource)/reception processing (for example, receiving the DCI including the SRI) based on the reference A/reference B.

For example, the UE may determine the SRS resource based on the PDCCH/DCI determined based on the certain time reference (for example, the reference A/reference B). This allows the UE to appropriately determine the SRS resource even when the PDCCH/DCI/control resource set are repeatedly transmitted.

Case 10

In discontinuous reception (DRX) control, a given timer (for example, a DRX timer) is controlled based on whether to notify a new transmission of PDCCH. For example, in a case where the PDCCH notifies a new transmission (DL or UL) on a serving cell of a given DRX group, the UE starts/restarts a timer of the DRX group (for example, drx-InactivityTimer) in the first symbol after terminating the PDCCH reception.

In this manner, in a case of controlling a given timer in the DRX control based on the PDCCH transmitted using the PDCCH repetition, an issue is which PDCCH/DCI the given timer is controlled (for example, started/restarted) based on.

Then, in the present embodiment, in the case of controlling the DRX based on the PDCCH repetition (or the PDCCH repeatedly transmitted), the UE may control the DRX control (for example, start/restart of the timer) based on the reference A/reference B.

For example, the UE may perform control such that the timer of the DRX group (for example, drx-InactivityTimer) is started/restarted in the first symbol after terminating the PDCCH reception determined based on the certain time reference (for example, the reference A/reference B).

Case 11

Bandwidth part (BWP) change/switchover/switching is controlled based on the receiving timing of the PDCCH/DCI. For example, in a case where the UE detects the DCI format indicating active DL BWP change (DL BWP change) in a cell, the UE may not be requested for reception or transmission in the cell for a duration from the end of the third symbol in a slot in which the UE receives a PDCCH including the DCI format in a scheduling cell to the beginning of a slot indicated by a slot offset value of the time domain resource allocation field of the DCI format.

In a case where the UE detects the DCI format indicating active UL BWP change (UL BWP change) in a cell, the UE may not be requested for reception or transmission in the cell for a duration from the end of the third symbol in a slot in which the UE receives a PDCCH including the DCI format in a scheduling cell to the beginning of a slot indicated by a slot offset value of the time domain resource allocation field of the DCI format.

In this manner, in a case of controlling the BWP change/switchover/switching based on the PDCCH transmitted using the PDCCH repetition, an issue is which PDCCH/DCI the control is performed based on.

Then, in the present embodiment, in the case of controlling the BWP change/switchover/switching based on the PDCCH repetition (or the PDCCH repeatedly transmitted), the UE may perform control based on the PDCCH determined based on the reference A/reference B.

For example, the UE may control the BWP change/switchover/switching, based on the PDCCH determined based on the certain time reference (for example, the reference A/reference B).

Case 12

Use of a resource available for a PDSCH is limited depending on whether the resource overlaps a resource for a control resource set corresponding to the PDCCH/DCI scheduling the PDSCH. For example, in a case where a PDSCH scheduled by a PDCCH overlaps a resource in a control resource set including the PDCCH, resources corresponding to the PDCCH scheduling the PDSCH (for example, the PDCCH detected by the UE) and an associated PDCCH DMRS is not available for the PDSCH.

In this manner, in a case where there are a plurality of PDCCH candidates for the PDCCH repetition, if part of the PDCCH repetition is not detected by the UE, an issue is whether all the PDCCH candidates for the PDCCH repetition is not available for the PDSCH, or only the detected PDCCH is not available for the PDSCH.

In the present embodiment, in a case where in the PDCCH repetition, a PDSCH scheduled by a PDCCH overlaps a resource in a control resource set including the PDCCH repetition, the following option 12-1 or 12-2 may be applied.

Option 12-1

The UE may determine/assume that resources corresponding to a union of the PDCCH scheduling the PDSCH (for example, the PDCCH detected by the UE) and an associated PDCCH DMRS are not available for the PDSCH to perform control.

Option 12-2

The UE may perform the control such that resources corresponding to a union of the PDCCH scheduling the PDSCH (for example, the PDCCH detected by the UE) and an associated PDCCH DMRS are not available for the PDSCH. Furthermore, the UE may determine/assume that resources corresponding to a PDCCH candidate associated with a PDCCH detected as the PDCCH repetition and an associated PDCCH DMRS are not available for the PDSCH to perform control.

The association between the PDCCH candidate/control resource set/search space set for PDCCH repetition may be defined by a specification, or configured for the UE from the base station by higher layer signaling or the like.

Case 13

A MAC entity (for example, the UE) monitors the PDCCH occasion, for example, in the DRX control, but needs not monitor (or is not required to monitor) the PDCCH in a case not of a complete PDCCH occasion. The case not of a complete PDCCH occasion may be, for example, a case where an active time starts/stops in the middle of a PDCCH occasion.

In this manner, in the case of the PDCCH repetition, when the active time starts/stops in the middle of two PDCCH repetitions, an issue is whether or not the MAC entity needs to monitor the PDCCH occasion (or how to control the monitoring).

In the present embodiment, in a case of applying the PDCCH repetition in the DRX control and that the PDCCH repetition is not a complete PDCCH repetition, at least one of the following options 13-1 to 13-4 may be applied. The case where the PDCCH repetition is not a complete PDCCH repetition may be a case where, for example, the active time starts/stops in the middle of the PDCCH repetition.

Option 13-1

Figure 5:
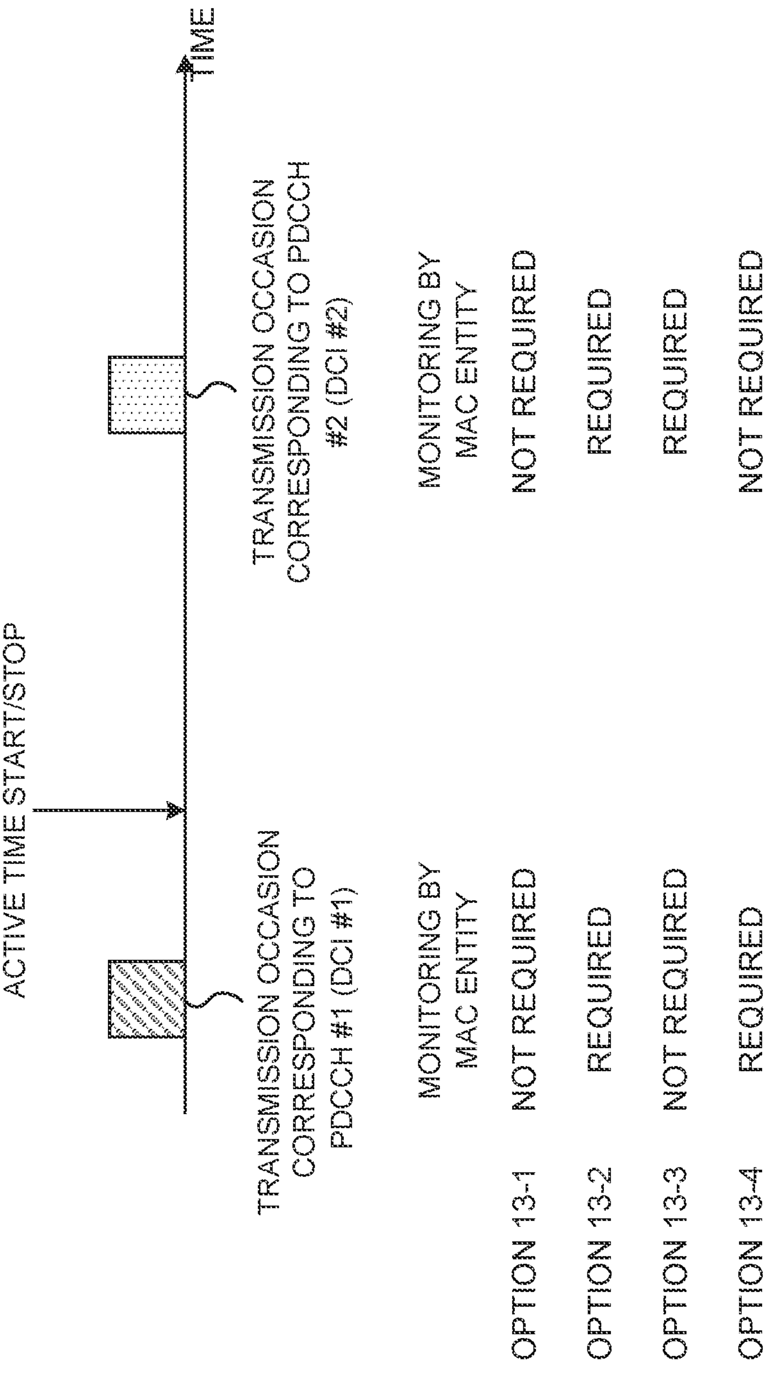
FIG. 5 is a diagram to show another example of the communication control using the PDCCH repetition in the present embodiment.

The MAC entity may be configured not to need to monitor the all PDCCH repetitions (or not to be required to monitor the all PDCCH repetitions) (see FIG. 5). FIG. 5 shows a case where an active time starts/stops between an occasion at PDCCH repetition #1 and an occasion at PDCCH repetition #2. In this case, the MAC entity may be configured not to be required to monitor the PDCCH on the occasion at PDCCH repetition #1 and the occasion at PDCCH repetition #2.

Option 13-2

The MAC entity may be configured to need to monitor the all PDCCH repetitions (or to be required to monitor the all PDCCH repetitions) (see FIG. 5). In FIG. 5, the MAC entity may be configured to be required to monitor the PDCCH on the occasion at PDCCH repetition #1 and the occasion at PDCCH repetition #2.

Option 13-3

The MAC entity may be configured to need to monitor the PDCCH repetition after the active time starts/stops (or to be required to monitor only the PDCCH repetition after the active time starts/stops) (see FIG. 5). In FIG. 5, the MAC entity may be configured to be not required to monitor the PDCCH on the occasion at PDCCH repetition #1 and to be required to monitor the PDCCH on the occasion at PDCCH repetition #2.

Option 13-4

The MAC entity may be configured to need to monitor the PDCCH repetition before the active time starts/stops (or to be required to monitor only the PDCCH repetition before the active time starts/stops) (see FIG. 5). In FIG. 5, the MAC entity may be configured to be required to monitor the PDCCH on the occasion at PDCCH repetition #1 and to be not required to monitor the PDCCH on the occasion at PDCCH repetition #2.

Variations

It may be supported/permitted that different options are applied to the case where the active time starts in the middle of the PDCCH repetition and the case where the active time stops in the middle of the PDCCH repetition. This makes it possible to more flexibly control the monitoring the PDCCH repetition.

The association between the PDCCH candidate/control resource set/search space set for PDCCH repetition may be defined by a specification, or configured for the UE from the base station by higher layer signaling or the like.

UE Capability Information

The UE may report, to the base station, whether to support the PDCCH repetition as UE capability information (UE capability). For example, the UE may report, to the base station, whether to support the multiplexing scheme (TDM/SDM/FDM) applicable to the PDCCH repetition.

The UE may report, to the base station, whether to support any of inter-slot PDCCH repetition, intra-slot PDCCH repetition, or intra-mini-slot PDCCH repetition for the PDCCH repetition transmitted in different time domains (TDM PDCCH repetition).

The UE may report, to the base station, the UE capability related to the number (for example, the maximum number) of repetitions. The maximum number of repetitions may be configured separately or in common for a plurality of multiplexing schemes (TDM/SDM/FDM).

The UE may report whether to support any of the case where the DCI payload contents are the same and the case where the DCI payload contents are different from each other in the repetition PDCCH (for example, inter-slot/intra-slot/intra-mini-slot TDM PDCCH repetition).

The UE may report, to base station, whether to support the notification of the number of repetitions based on the DCI.

The UE may report, to base station, whether to support the PDCCH repetition with soft combining. Alternatively, the UE may report, to base station, whether to support the PDCCH repetition without soft combining.

The base station may control the transmission of PDCCH repetition based on the capability information reported from the UE. The base station may notify/configure the above-described UE capability information to/for the UE by use of the higher layer signaling or the like.

Note that the present embodiment may be applied to a multi-chance PDCCH transmission. For example, the DCI scheduling the same PDSCH/PUSCH/RS/TB and the like and the DCI resulting in the same outcome may be separated.

(PDCCH Repetition Related Information/Configuration Information)

Information/configuration information related to transmission of PDCCH repetition may be transmission conditions/transmission parameters applied to the transmission of PDCCH repetition. The transmission condition/transmission parameter applied to the transmission of PDCCH repetition may be at least one of the number of PDCCH repetitions (for example, PDCCH repetition number), a time interval to which the PDCCH repetition is applied, and an interval/offset between the PDCCHs in the transmission of PDCCH repetition.

The respective PDCCHs to which the transmission with repetition applied (for example, multi-PDCCH) may be transmitted from a plurality of TRPs. Different QCLs (or TCIs, beams) may be applied to the multi-PDCCH (or the PDCCHs transmitted from the different TRPs). In the present disclosure, the transmission of PDCCH repetition is applicable to a case of being transmitted one or a plurality of TRPs.

The information related to transmission of PDCCH repetition (for example, the number of PDCCH repetitions) may be notified/configured to/for the UE from the network (for example, the base station). The information related to transmission of PDCCH repetition may be notified/configured to/for the UE based on at least one of the following options 1-A to 1-B.

Option 1-A

The information related to transmission of PDCCH repetition may be notified/configured to/for the UE from the base station by use of higher layer signaling (for example, at least one of an RRC parameter and a MAC CE).

Option 1-B

The information related to transmission of PDCCH repetition may be dynamically notified to the UE from the base station by use of the downlink control information (for example, the DCI). The information related to transmission of PDCCH repetition may be notified by use of a new field configured in the DCI, or may be notified by use of a field configured in the existing system.

The information related to transmission of PDCCH repetition may be included in each PDCCH/DCIs to which the transmission with repetition is applied. In this case, the number of PDCCH repetitions included in the respective PDCCHs/DCIs may be the same. Alternatively, the number of PDCCH repetitions included in the respective PDCCHs/DCIs may be configured with different values (for example, the number of residual repetition times).

A size of the filed used to notify the information related to transmission with repetition (for example, the number of bits) may be determined based on the maximum number of PDCCH repetitions. The UE may determine the maximum number of PDCCH repetitions based on the capability information the UE reports (for example, the UE capability).

Alternatively, the maximum number of PDCCH repetitions may be notified/configured to/for the UE from the base station by higher layer signaling or the like. In this case, the base station may notify the UE of the PDCCH repetition number practically applied using the DCI. The size of the field (or the number of bits) used for notification of the number of PDCCH repetitions may be determined based on the maximum number of PDCCH repetitions notified/configured by higher layer signaling.

Whether or not notification of the number of PDCCH repetitions using the DCI is applied may be configured through given higher layer signaling. The UE may assume that a notification field for the number of PDCCH repetitions is present in the DCI in a case where the given higher layer signaling is configured, and may assume that notification field for the number of PDCCH repetitions is absent in the DCI in a case where the given higher layer signaling is not configured.

In this manner, in the case where the transmission of PDCCH repetition is applied, notifying/configuring the information related to transmission of PDCCH repetition to/for the UE from the base station enables the UE to appropriately grasp the transmission conditions/transmission parameters applied to the transmission of PDCCH repetition.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
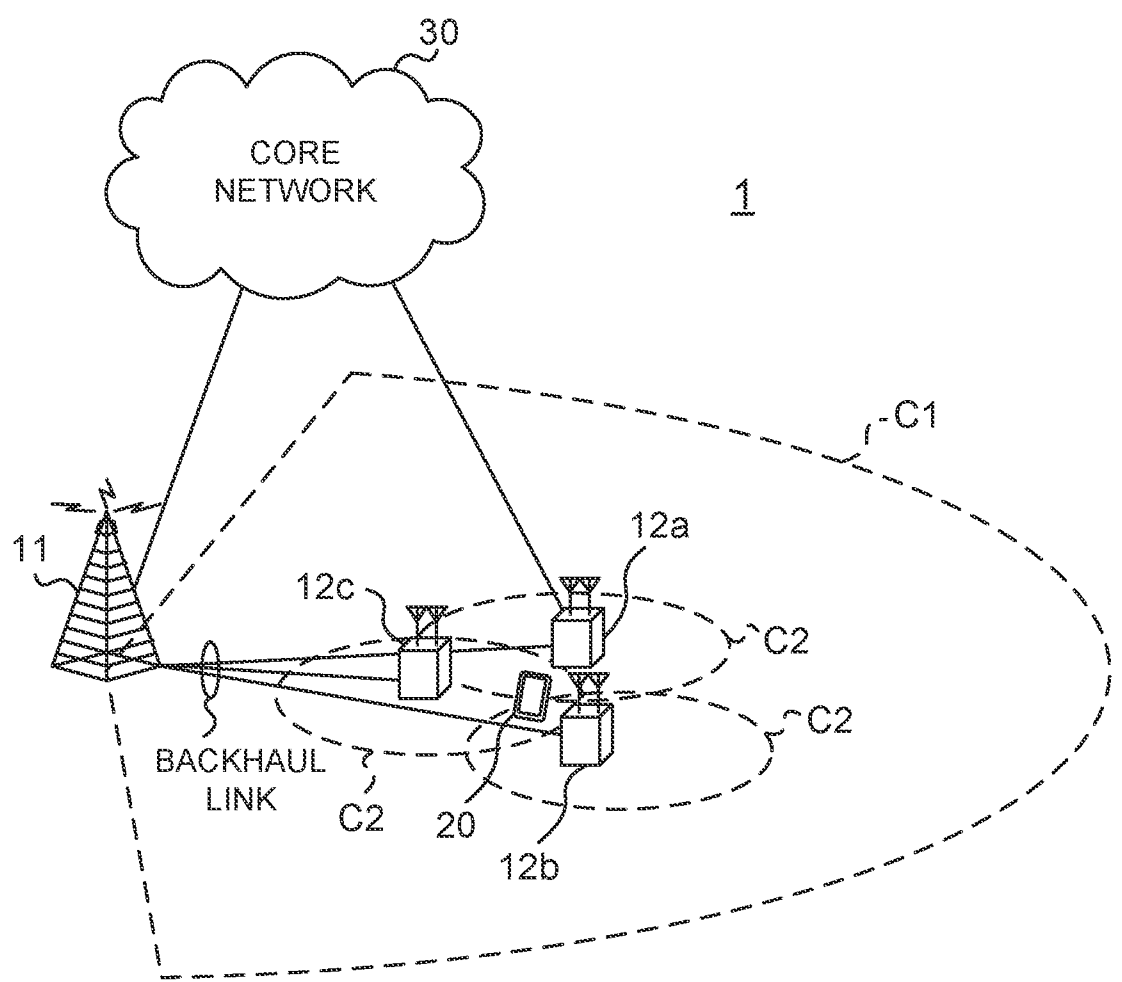
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

Base Station

Figure 7:
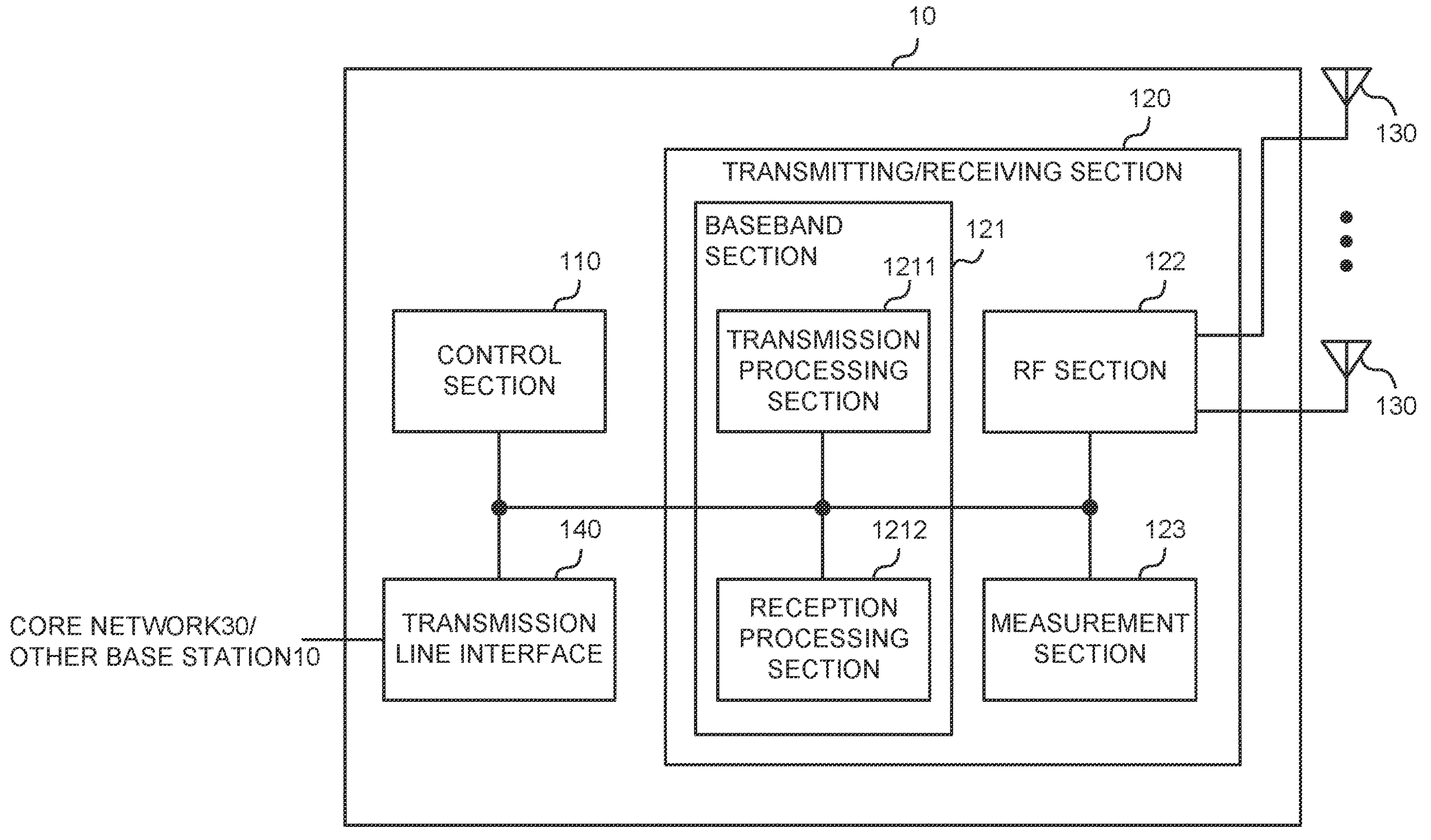
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 may transmit multiple downlink control information using respective downlink control channels to which transmission with repetition is applied.

The transmitting/receiving section 120 may control at least one of transmission processing and reception processing on the basis of at least one of a certain downlink control channel of the downlink control channels to which the transmission with repetition is applied, a certain downlink control information of the multiple downlink control information, and a certain control resource set of control resource sets corresponding to the downlink control channels to which the transmission with repetition is applied.

User Terminal

Figure 8:
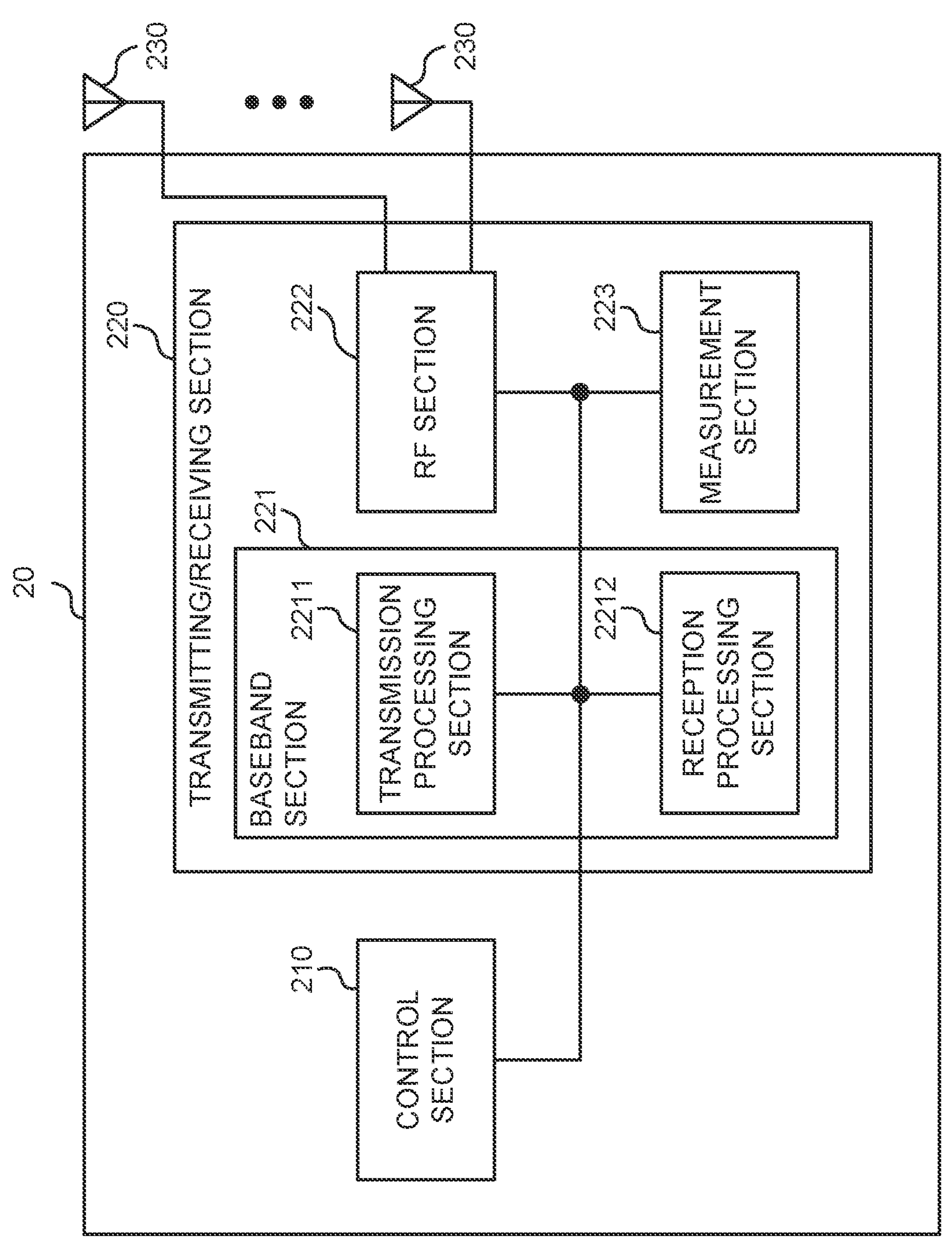
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

The transmitting/receiving section 220 may receive multiple downlink control information transmitted using respective downlink control channels to which transmission with repetition is applied.

The control section 210 may control at least one of transmission processing and reception processing on the basis of at least one of a certain downlink control channel of the downlink control channels to which the transmission with repetition is applied, a certain downlink control information of the multiple downlink control information, and a certain control resource set of control resource sets corresponding to the downlink control channels to which the transmission with repetition is applied. The downlink control information may be group common downlink control information. At least one of the transmission processing and the reception processing may be at least one of determining an allocation resource, determining a position of a physical shared channel, limiting a schedule, timer controlling, and switching a bandwidth part.

The control section 210 may perform control such that a resource corresponding to the downlink control channel used for scheduling the downlink shared channel and an associated downlink control channel demodulation reference signal is not used for the downlink shared channel in a case where the downlink shared channel overlaps a resource in the control resource set including the downlink control channels to which the transmission with repetition is applied. The control section 210 may perform control such that a resource corresponding to a downlink control channel candidate associated with a downlink control channel detected as a downlink control channel to which the transmission with repetition is applied is not used for the downlink shared channel.

The control section 210 may perform control, in a discontinuous reception, to monitor a certain downlink control channel or all downlink control channels of the downlink control channels to which the transmission with repetition is applied in the case where the active time starts or stops in the middle of the transmission with repetition of the downlink control channel. The control section 210 may differently control the downlink control channel to be monitored between a case where the active time starts in the middle of the downlink control channel transmission with repetition and a case where the active time stops in the middle of the downlink control channel transmission with repetition.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
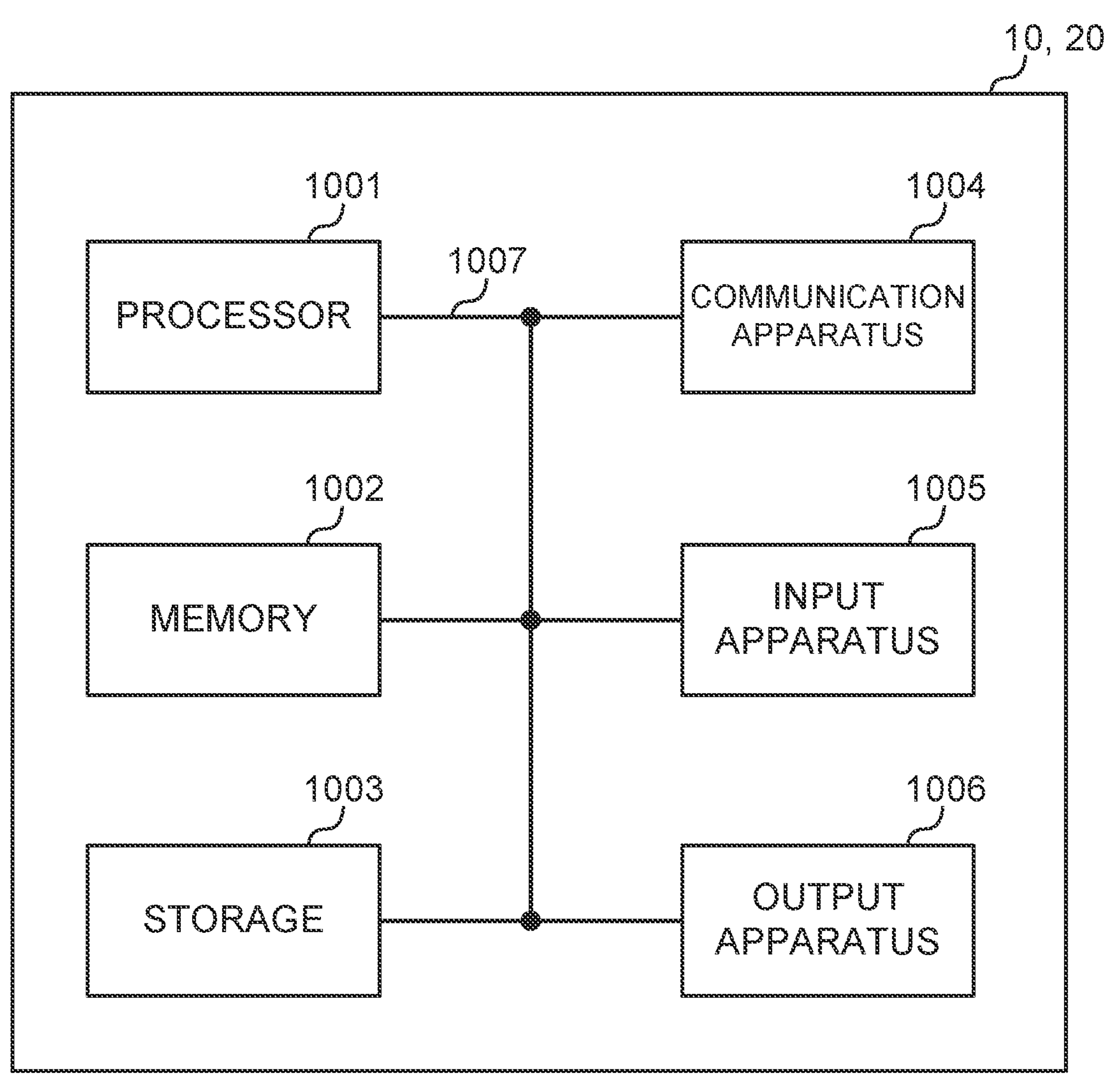
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for a numerology in a carrier. Here, a common RB may be specified by an index of the RB based on the common reference point of the carrier. A PRB may be defined by a BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2020-186152 filed on Nov. 6, 2020. The entire contents of the application are incorporated herein by reference.

The invention claimed is:

1. A terminal comprising:

a processor that monitors a physical downlink control channel (PDCCH) with repetition; and a receiver that receives a physical downlink shared channel (PDSCH) scheduled by the PDCCH, wherein when the PDSCH overlaps with a resource in a control resource set (CORESET) containing the PDCCH with repetition, resources corresponding to PDCCH candidates transmitted from different transmission/reception points (TRP) and associated with the PDCCH scheduling the PDSCH and an associated PDCCH demodulation reference signal (DM-RS) are not available for the PDSCH, and wherein the resources not available for the PDSCH comprise resources corresponding to a union of the PDCCH scheduling the PDSCH and the associated PDCCH DM-RS.

2. The terminal according to claim 1, further comprising: a transmitter that transmits UE capability information supporting the repetition.

3. A radio communication method for a terminal, comprising:

monitoring a physical downlink control channel (PDCCH) with repetition; and receiving a physical downlink shared channel (PDSCH) scheduled by the PDCCH, wherein when the PDSCH overlaps with a resource in a control resource set (CORESET) containing the PDCCH with repetition, resources corresponding to PDCCH candidates transmitted from different transmission/reception points (TRP) and associated with the PDCCH scheduling the PDSCH and an associated PDCCH demodulation reference signal (DM-RS) are not available for the PDSCH, and wherein the resources not available for the PDSCH comprise resources corresponding to a union of the PDCCH scheduling the PDSCH and the associated PDCCH DM-RS.

4. A base station comprising:

a transmitter that transmits a physical downlink control channel (PDCCH) with repetition; and a processor that, when a physical downlink shared channel (PDSCH) overlaps with a resource in a control resource set (CORESET) containing the PDCCH with repetition, controls to make resources corresponding to PDCCH candidates transmitted from different transmission/reception points (TRP) and associated with the PDCCH scheduling the PDSCH and an associated PDCCH demodulation reference signal (DM-RS) not available for the PDSCH, wherein the resources not available for the PDSCH comprise resources corresponding to a union of the PDCCH scheduling the PDSCH and the associated PDCCH DM-RS.

5. A system comprising: a terminal; and a base station, the terminal comprising:

a processor that monitors a physical downlink control channel (PDCCH) with repetition applied; and a receiver that receives a physical downlink shared channel (PDSCH) scheduled by the PDCCH, wherein when the PDSCH overlaps with a resource in a control resource set (CORESET) containing the PDCCH with repetition, resources corresponding to PDCCH candidates transmitted from different transmission/reception points (TRP) and associated with the PDCCH scheduling the PDSCH and an associated PDCCH demodulation reference signal (DM-RS) are not available for the PDSCH, and wherein the resources not available for the PDSCH comprise resources corresponding to a union of the PDCCH scheduling the PDSCH and the associated PDCCH DM-RS, and the base station comprising:

a transmitter that transmits the PDCCH; and a processor that controls to make the resources corresponding to the PDCCH candidates and the associated PDCCH DM-RS not available for the PDSCH.

* * * * *